E. J. SWEETLAND.
APPARATUS FOR REMOVING AND RECLAIMING SOLIDS FROM GASES.
APPLICATION FILED AUG. 4, 1915.
1,321,490.
Patented Nov. 11, 1919.
2 SHEETS—SHEET 2.
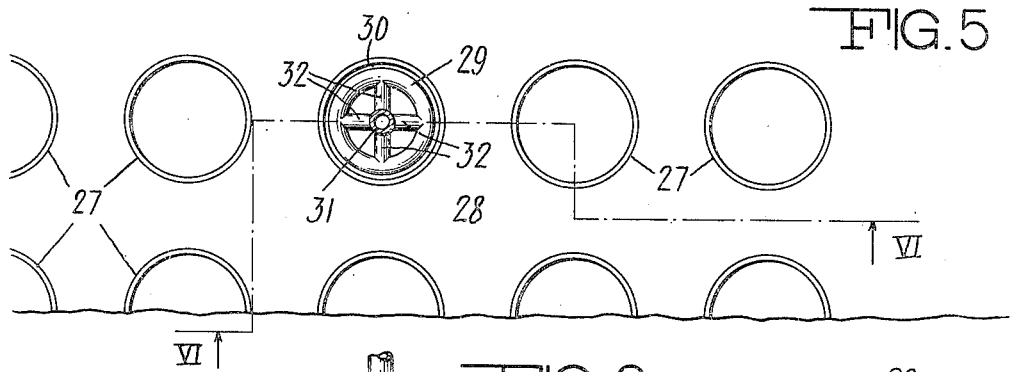
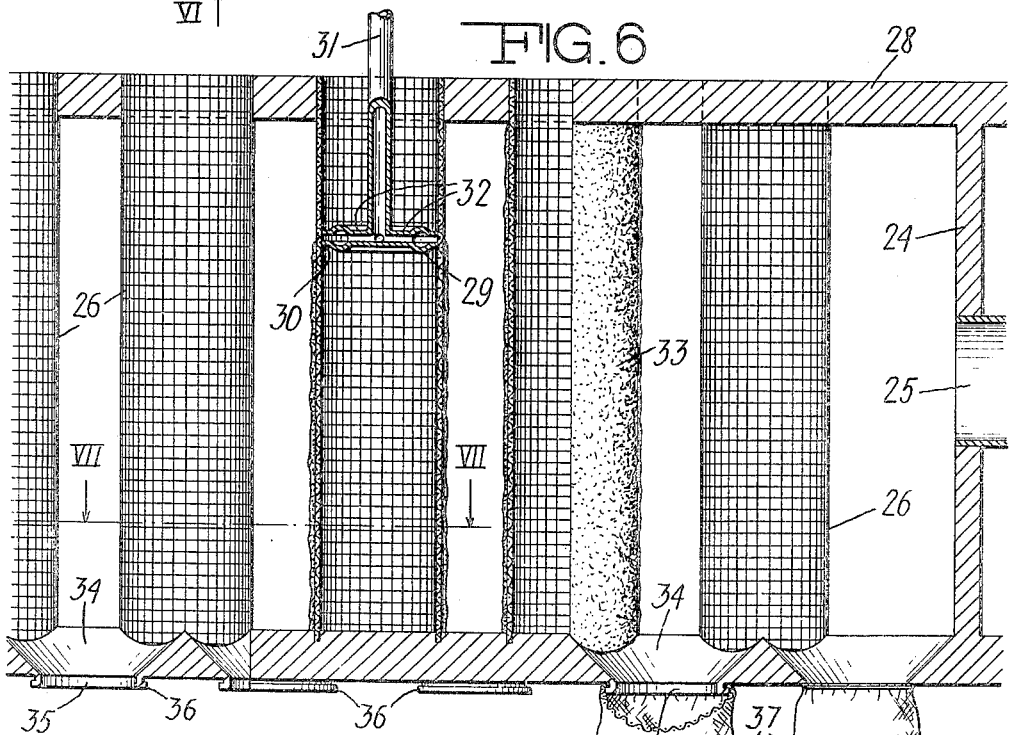
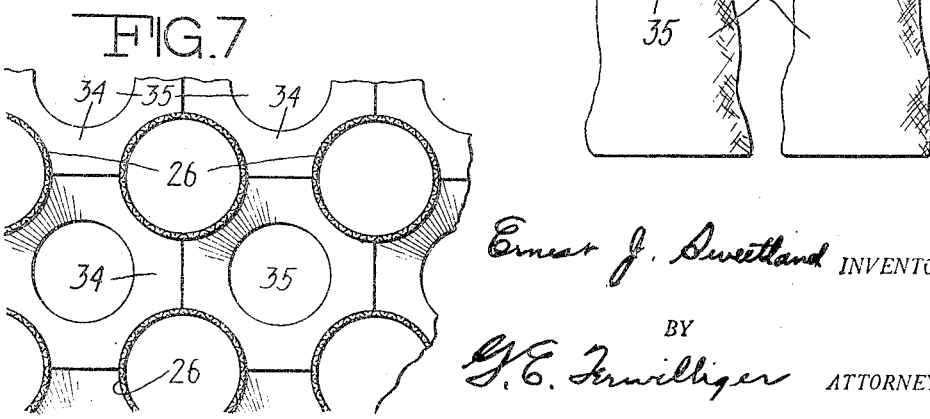
Ernest J. Sweetland INVENTOR.
BY
G. E. Terwilliger ATTORNEY

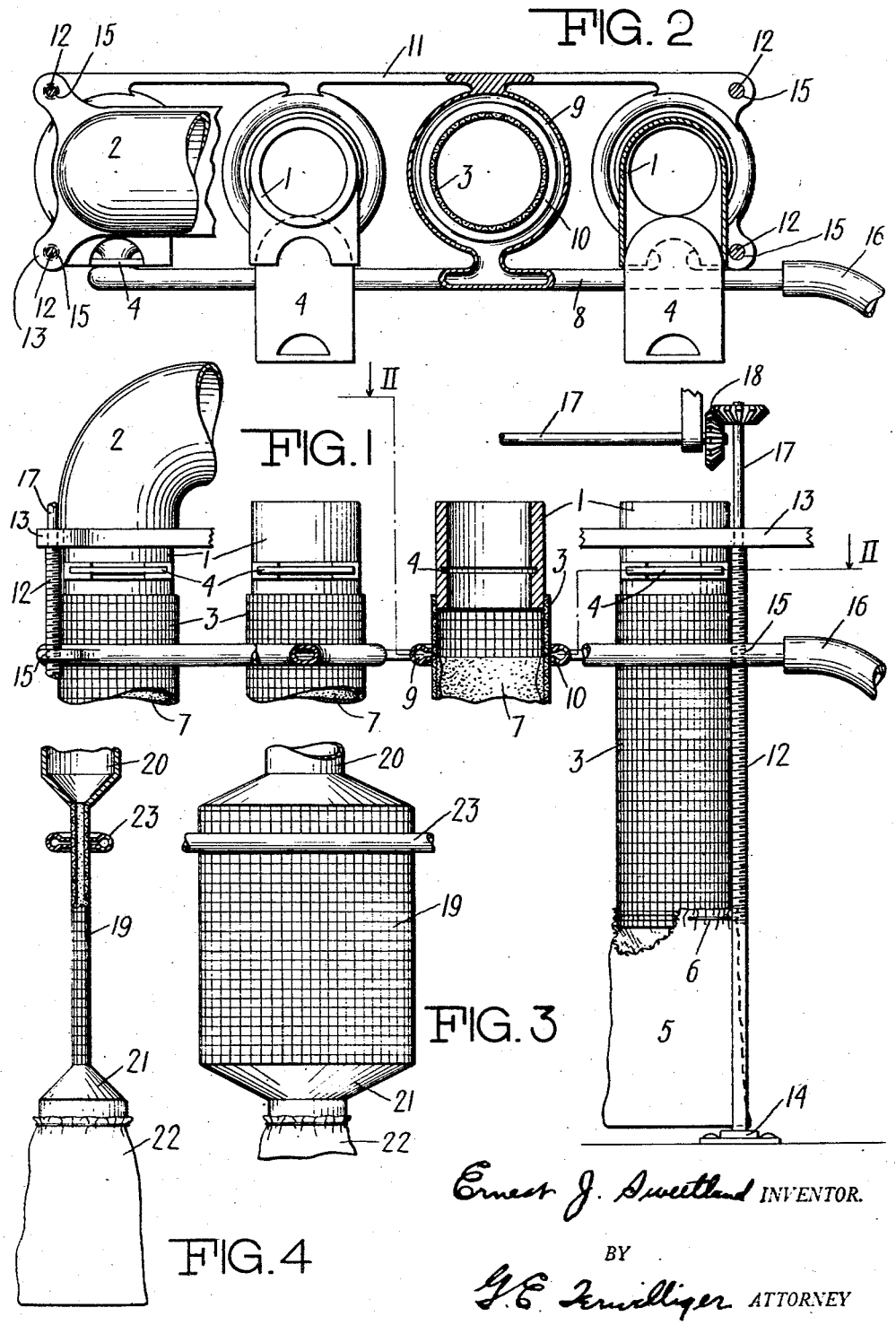

UNITED STATES PATENT OFFICE.

ERNEST J. SWEETLAND, OF MONTCLAIR, NEW JERSEY, ASSIGNOR, BY MESNE ASSIGNMENTS, TO UNITED FILTERS CORPORATION, A CORPORATION OF DELAWARE.

APPARATUS FOR REMOVING AND RECLAIMING SOLIDS FROM GASES.

1,321,490.  Specification of Letters Patent.  Patented Nov. 11, 1919.

Application filed August 4, 1915. Serial No. 43,516.

*To all whom it may concern:*

Be it known that I, ERNEST J. SWEETLAND, a citizen of the United States, residing in the town of Montclair, county of Essex, and State of New Jersey, have invented certain new and useful Improvements in Apparatus for Removing and Reclaiming Solids from Gases, of which the following is a specification.

My invention relates broadly to improved methods and means for removing solids from gases, particularly when it is desired to reclaim the solid. In many manufacturing and metallurgical processes there is evolved at some stage of the operation a large volume of gas which in itself may or may not be worthless, but which carries in suspension very finely divided particles of some solid which it is desired to reclaim, either as the main object of the process or in the nature of a by-product. For the purposes of this specification I shall point out only certain situations in which such a condition is encountered, but it will be obvious to those skilled in the various arts to which my invention has reference, that there are many other applications of my invention where like or similar situations arise.

One typical example of a set of conditions to which my improved process and apparatus are particularly applicable arises in the production of zinc oxid. In one well-known method of manufacture of this substance the zinc oxid appears as an exceedingly finely divided solid, or dust, which is suspended in a relatively large volume of gas. The metallurgical processes leading up to this condition need not be described since they are well known. The problem presented is to remove and reclaim the minute floating particles of zinc oxid from the gas in which they are suspended. Ordinarily these particles are of such small size that they may be described with substantial accuracy as being almost colloidal, that is, they are so small that they show no appreciable tendency to settle by gravity, and the atmosphere of a room filled with gas in which they are suspended will not clear itself even after several hours. The most usual method, so far as I am aware, of reclaiming the zinc oxid from the suspending gas is to pass the gas through what is known as a bag house, which usually consists of a large room filled with a number of tubular bags which may be, approximately, 18 inches in diameter and 20 to 40 feet in length. The gas under pressure enters each bag at its top and the supply continues for a period of five or six hours, during which time the gas is cleaned by its passage through the cloth of which the bags are constructed. The supply is then shut off and the bags are shaken by hand, causing the zinc oxid which has gathered in a layer on the interior of the bag to fall into a sack placed at the bottom of each bag for the purpose of receiving the collected oxid. The method of shaking requires that the supply be shut off entirely while it is in progress, which in itself is a serious disadvantage, as it makes the process of reclamation intermittent. Furthermore, while a considerable portion of the oxid dust clinging to the inner surface of the bag is removed by shaking, the bag is never fully cleaned by this method, and it is my belief that the full efficiency of the ordinary cotton or woolen bag is realized only during the first few minutes it is in service, because of the fact that the oxid dust lodging in the interstices of the cloth clogs the pores of the cloth that form the only avenue of escape for the gas. This reduces the venting capacity of the bag with respect to the gas, consequently lowering the rate at which the oxid is deposited on the interior of the bag, since this rate is obviously proportional to the rate of flow of gas through the bag. The shaking of the bag never thoroughly cleans the pores of the cloth, so that not only is the efficiency of the bag greatly reduced after the first few minutes of operation during each cycle initiated by a shaking, but the original efficiency of new cloth as a filtering medium is never again realized after the bag is once put in operation.

A further objection to the use of cotton, wool or any other fiber as the main constituent of bags for such work lies in the fact that the gases to be filtered usually have a temperature which is considerably higher than normal atmospheric temperature, with the result that the heat rapidly dries out the fiber and shortens its life. In fact, in some instances, the temperature rises to such a point that the life of the bags is only a few hours. Furthermore, corrosive fumes are frequently present in the gases in which the oxid is suspended, and these fumes are liable to attack the cloth in case it is made of cotton, wool or other organic fiber.

In accordance with my improvements in the art I provide a quick, economical and inexpensive means for cleaning oxid dust from the bags on which it has accumulated in the process of its separation from the suspending gases, and I also contemplate the use of a bag which is constructed of a material having a non-organic base, such, for instance, as a woven metallic cloth. This cloth may preferably be made of Monel metal or nickel so that it will resist corrosive fumes to a great extent.

In practising my invention I preferably utilize as the means for cleaning the bags, irrespective of the material of which they may be constructed, a localized flow or jet of gas, such as compressed air, flowing in a direction counter to the normal direction of the flow of the gas bearing the oxid, and having a substantially greater pressure, so that it will overcome the pressure of the gas seeking to escape through the bags. The relatively high velocity of a very small volume of gas, such as compressed air, impinging at close range on the cloth in a reverse direction to the normal direction of the flow through the cloth will readily dislodge the particles of zinc oxid dust or other substance deposited thereon far more efficiently than can be done by any shaking and without necessitating any change in the position or shape of the bag. The cleaning operations may be carried on at much more frequent intervals, facilitating the passage of a large volume of the suspending gas through the bag, and this operation has the added advantage that it does not require the supply of solid-laden gas to be shut off. The process of filtration or reclamation of the solid is thus substantially continuous, and while the cost of the labor involved in shaking the bags oftener than every few hours by the old process becomes excessive, it is entirely feasible to clean the bags by my process at relatively frequent intervals without increasing the cost of reclamation. It is obvious that where it is practicable to clean the bag fabric at frequent intervals, as, for instance, every half hour instead of every five or six hours, the volume of solid-laden gas passing through the bags under any given conditions of pressure will be enormously increased since the layer of oxid dust or the like deposited upon the bag, which hinders the flow of the gas, will never reach the thickness that it usually attains in the present method of reclaiming the oxid. The opposition to the passage of the suspending gas through the bag is, of course, correspondingly reduced.

I have found that the volume of air necessary for thoroughly cleaning the bag fabric is so small that it does not cause any appreciable detrimental agitation on the inside of the bag, its volume being negligible in proportion to the volume of gas being filtered. Moreover, the pressure of the solid-laden gas is usually only a few ounces to the square inch, whereas the pressure of the compressed air or other gas used to clean the bag may be many pounds, so that the opposition offered to the cleaning jet by the gas within the bag is negligible.

While I do not regard it as essential that my improved process and apparatus be used in connection with bags constructed of metallic fabric, as above described, still there are certain advantages gained by this construction, as already pointed out, and the use of my cleaning method with metallic bags is particularly advantageous because of the fact that it is practically impossible to clean metal cloth or the like by shaking unless sufficient force is used to dent the cloth or otherwise mechanically injure it.

In the accompanying drawings, which form a part of this specification, Figure 1 is an elevation, parts being in section and other parts broken away to show the internal construction of a simple form of apparatus embodying certain features of my invention. Fig. 2 is a sectional view on line II—II of Fig. 1. Fig. 3 is a side elevation of a modified form of apparatus using a wide, flattened bag construction. Fig. 4 illustrates an end view of the structure of Fig. 3, parts being in section to show the internal construction. Fig. 5 is a plan view of a modified form of construction. Fig. 6 is a vertical view partly in section, taken on line VI—VI of Fig. 5. Fig. 7 is a transverse sectional view on line VII—VII of Fig. 6.

Referring to the drawings in detail, the numeral 1 designates a series of vertical pipes, each one of which is fed from an inlet or supply manifold 2. The bottom of each of these pipes opens into a vertical, cylindrical bag 3, which may be constructed of the cotton or woolen cloth frequently used for such purpose, or may be comprised of the fabric described in my Patent #1,147,279, July 20, 1915, or some other fine metal cloth may be used, such as a good grade of Dutch cloth having comparatively small interstices, and yet woven from wire sufficiently heavy to give it considerable rigidity and strength when formed into a hollow cylinder. Any suitable valve, such as the slide valve 4 may be provided in each of the pipes 1 for the purpose of controlling the supply of gas admitted to the particular bag attached to that pipe. At the bottom of each bag a sack 5 is preferably placed, the neck of which may be retained in position at the bottom of the bag by means of a draw-string 6.

The solid-laden gas is introduced into the pipes 1 through the inlet or supply manifold 2, and the gas passes out through the bags 3, leaving an internal layer 7 of solid material deposited on the inside of each bag. When this layer has attained such a thickness that filtration or the rate of escape of the gas through the bags becomes slower than is efficient, this layer may be dislodged and the particles forming it caused to fall into the sack at the bottom of each bag by causing a progressive reverse flow of compressed air, or other gas under pressure, through the bag. This may be accomplished by injecting the compressed air, or other cleansing medium, into an inlet manifold 8, which feeds a hollow ring 9 surrounding each bag and having a preferably continuous slit 10 leading from its interior to the surface of the bag. It will be understood that the inner periphery of each ring closely embraces the outer surface of the bag which it surrounds. The rings may be stiffened by means of a frame member 11, and may be raised or lowered by any suitable means, such as four vertical screws 12 mounted in a fixed frame 13 and the foot step bearings 14. These screws coöperate with nuts or internally threaded lugs 15. All four screws may be simultaneously driven in either direction so as to cause the cleansing rings 9 to rise or fall by means of shafting 17 and gearing 18. The inlet manifold may be fed from any suitable supply source, such as a flexible hose 16.

The cleaning operation may be carried on continuously by causing the cleaning rings to reciprocate back and forth along the surface of their respective bags at a slow rate, or they may be caused to either rise or fall, as the case may be, at a somewhat more rapid rate at fixed intervals, such, for instance, as half an hour. The compressed air entering the inlet manifold 8 through the supply pipe 16 will find its only outlet through the slits 10. The narrow peripheral stream of air will thus be caused to pass through the bags from the outside inwardly at a comparatively high velocity, thus effectively dislodging the layer deposited on the interior of the bag. The dislodged oxid or dust falls into the sack 5, whence it may be collected as desired.

In Fig. 1 a condition is illustrated in which the cleaning rings have just commenced a down stroke. The deposited layer of oxid dust, or other solid, on the interior of the bag shown in section is illustrated as having been removed from that portion of the bag over which the ring has already passed.

In Figs. 3 and 4, I have illustrated a modification of the structures shown in Figs. 1 and 2, in which the bags 19, instead of being cylindrical as are the bags 3, are flattened and are provided with flat filtering surfaces. This construction may be desirable for some purposes. The bags are fed from inlet pipes 20 and are provided at their bottoms with necks 21 leading to sacks 22, having the same functions as the sacks 5 already described. The cleaning rings 23 are, of course, modified in their outline so as to follow closely the outer periphery of the bags. Their internal construction and mode of operation and manipulation may be the same as those of the cleaning rings 3 above described.

In Figs. 5, 6 and 7 I have illustrated a modification in which the solid-laden gas, instead of being admitted to the interior of the bags, is supplied to a closed chamber surrounding the bags, so that the outlet for the gas is into the interior of the bag, whence it may be led off or escape in any desired manner. In this type of apparatus the numeral 24 designates a closed chamber into which the solid laden gas may be introduced by means of an inlet pipe 25. Vertical cylindrical bags 26 of any of the materials already described as suitable for their construction, extend preferably from the floor to the ceiling of the chamber, their upper ends passing through openings 27 in the ceiling 28 of the chamber. There is a gas-tight joint between the ceiling 28 and the adjacent portion of each bag, so that the only avenue for the escape of the gas is into the interior of each bag and then upward. In thus passing through the fabric of which the bag is constructed the solid particles will be filtered out just as in the case of the gas passing outward from the interior of the bags in the type of apparatus shown in Figs. 1 to 4 inclusive, the only difference being that in the modification now being described, the layer of solid material will be deposited on the exterior of the bag instead of on the interior, and the direction of flow of the gas is reversed.

The cleaning device in this case consists of a ring 29 provided with a preferably continuous peripheral slit 30. This ring is adapted to be inserted into the interior of each of the bags and has such an external diameter that it will closely engage the inner surface of each bag. Compressed air, or other cleaning medium, may be supplied to the ring by means of an inlet pipe 31 communicating with hollow spokes 32 leading to and supporting the ring.

In operating a device of this type the solid-laden gas is supplied through the inlet passage 25 and finds its outlet through the various bags, in doing so depositing the solids with which it is charged upon the bags in the form of layers 33. When it is desired to clean any bag or battery of bags, a workman walking on the floor above the ceiling of the chamber 24 may insert the cleaning ring into the bag from which it is desired to remove the deposit. The compressed air acts in the manner already described, dislodging the particles of oxid dust or other solid. The floor, is in the form of a plurality of adjoining conical surfaces 34, each of which leads down to an orifice 35 formed with a neck 36 to which may be attached a receiving sack 37 as above. The particles of deposited solid dislodged from the outer surface of each bag will fall to the floor, and by virtue of the conical surfaces of which it is formed will fall by gravity into the nearest one of the sacks 37.

It will be obvious that in the construction shown in Figs. 5, 6 and 7 a single cleaning ring 29 supplied from any suitable source, such as a long flexibile hose, may be used by a workman to clean all the bags, one by one, or each of the bags may be provided with one of these rings, just as are the bags 3 in the type first described, and when a plurality of rings are used they may be moved synchronously either continuously or at intervals by means of suitable gearing, such as the type illustrated in Figs. 1 and 2.

While I have illustrated and described only certain applications of my process, and only certain apparatus for its use, and while I have pointed out the details of its use in connection with the reclamation of only a single substance, it will be apparent that my invention is of broad application and I do not desire to be limited either to the precise construction shown and described, or to the application of the process involved in their use to the reclamation of any specific substance.

Having thus described my invention, I claim:

1. A device for removing solids from gases under pressure, including a tubular intercepting member through the walls of which the gas is caused to pass, and a circular nozzle member slidable longitudinally along the tubular intercepting member for forcing a reverse current of gas through the walls thereof at successive zones, thereby removing the solid matter deposited upon the walls of the tubular intercepting member.

2. A device for removing solids from gases under pressure, including a tubular intercepting member through the walls of which the gas is caused to pass, an annular nozzle extending around the tubular intercepting member and slidable longitudinally thereon, said nozzle serving to force a reverse current of gas through the walls of the tubular intercepting member at successive zones thereof for the purpose of removing the solid matter deposited on the tubular intercepting member.

3. A device for removing solids from gases under pressure, including a tubular intercepting member through the walls of which the gas is caused to pass, a hollow ring extending around the tubular intercepting member and provided at its inner periphery with a narrow annular slit, said ring being slidable upon the tubular intercepting member, and means for supplying compressed gas to the hollow ring, said gas issuing from the slit of the hollow ring in the form of a jet which passes through the walls of the tubular intercepting member in a direction counter to that of the main supply and removes the solid matter deposited upon the walls.

4. A device for removing solids from gases under pressure, including a series of tubular intercepting members which are arranged in a parallel relation and through the walls of which the gas is caused to pass, a frame movable longitudinally along the tubular intercepting members, means for moving the frame, annular nozzles carried by the frame and extending around the respective intercepting members, and means for supplying compressed gas to the several annular nozzles, said nozzles serving to force a reverse current of gas through the walls of the tubular intercepting members walls of the tubular intercepting members to remove the solid matter deposited thereon.

E. J. SWEETLAND.